(12) United States Patent
Zahn et al.

(10) Patent No.: US 12,439,723 B2
(45) Date of Patent: Oct. 7, 2025

(54) PROCESS AND APPARATUS FOR MANUFACTURING SOLAR PANELS

(71) Applicant: M10 Solar Equipment GmbH, Freiburg (DE)

(72) Inventors: Philipp Donatus Martin Zahn, Freiburg (DE); Günter Schneidereit, Freiburg (DE); Dominique Jehl, Rhinau (FR)

(73) Assignee: M10 Solar Equipment GmbH, Freiburg (DE)

( * ) Notice: Subject to any disclaimer, the term of this patent is extended or adjusted under 35 U.S.C. 154(b) by 259 days.

(21) Appl. No.: 18/279,914

(22) PCT Filed: Dec. 21, 2021

(86) PCT No.: PCT/EP2021/087148
§ 371 (c)(1),
(2) Date: Sep. 1, 2023

(87) PCT Pub. No.: WO2022/189031
PCT Pub. Date: Sep. 15, 2022

(65) Prior Publication Data
US 2024/0162369 A1    May 16, 2024

(30) Foreign Application Priority Data

Mar. 11, 2021 (DE) .......................... 102021105985.2

(51) Int. Cl.
*H10F 71/00*    (2025.01)
*A47J 31/22*    (2006.01)
(Continued)

(52) U.S. Cl.
CPC ............ *H10F 71/137* (2025.01); *A47J 31/22* (2013.01); *A47J 31/407* (2013.01);
(Continued)

(58) Field of Classification Search
None
See application file for complete search history.

(56) References Cited

U.S. PATENT DOCUMENTS

2015/0349167 A1*  12/2015  Morad ................. H10F 19/804
                                              136/251
2016/0163912 A1    6/2016  Gonzalez et al.
2016/0163914 A1    6/2016  Gonzalez et al.

FOREIGN PATENT DOCUMENTS

CN          104600141 B      4/2018
DE          20220444         9/2003
(Continued)

OTHER PUBLICATIONS

Machine English translation of WO2010000812, Accessed Jul. 14, 2025 (Year: 2010).*

*Primary Examiner* — Abbas Rashid
*Assistant Examiner* — Adrianna N Konves
(74) *Attorney, Agent, or Firm* — Volpe Koenig

(57) ABSTRACT

Improvements in the technical field of solar panel (2) manufacturing are provided. To this effect, a process for manufacturing solar panels (2) is disclosed in which rows (4) of solar elements (3) are bonded together by an electrically conductive adhesive, with the electrically conductive adhesive being applied to the solar elements (3) during a transfer movement of the rows (4) of solar elements (3).

18 Claims, 4 Drawing Sheets

(51) Int. Cl.
*A47J 31/40* (2006.01)
*A47J 31/44* (2006.01)
*B41F 15/08* (2006.01)
*H10F 19/90* (2025.01)
*H10F 77/30* (2025.01)

(52) U.S. Cl.
CPC ....... *A47J 31/4403* (2013.01); *B41F 15/0895* (2013.01); *H10F 19/902* (2025.01); *H10F 77/311* (2025.01)

(56) References Cited

FOREIGN PATENT DOCUMENTS

| | | |
|---|---|---|
| DE | 102008046327 | 3/2010 |
| DE | 102013010447 | 12/2014 |
| WO | 2010000812 | 1/2010 |
| WO | 2016063244 | 4/2016 |
| WO | 2016090304 | 6/2016 |

\* cited by examiner

PROCESS AND APPARATUS FOR MANUFACTURING SOLAR PANELS

CROSS-REFERENCE TO RELATED APPLICATIONS

This application is a 371 National Phase of PCT/EP2021/087148, filed Dec. 21, 2021, which claims priority from German Patent Application No. 10 2021 105 985.2, filed Mar. 11, 2021, both of which are incorporated herein by reference as if fully set forth.

TECHNICAL FIELD

The invention relates to a method and a device for producing solar modules.

BACKGROUND

Methods and devices of this type are already known from practice. In this context, solar elements are combined to form rows and the solar modules are constructed from electrically interconnected rows. The solar elements used for this may be photovoltaic solar cells or partially sectioned parts of them, what are referred to as shingles.

SUMMARY

It is an object of the invention to provide a method for producing solar modules and a corresponding direction which promote the efficient production of solar modules.

To achieve the object, what is proposed first of all is a method which comprises one or more of the means and features disclosed herein, which concern a method for producing solar modules. In particular, to achieve the object, what is thus proposed in the case of the method mentioned in the introduction is that the rows are adhesively bonded with an electrically conductive adhesive and that the electrically conductive adhesive is applied to the solar elements while the rows are being moved for transfer, in particular while a solar module is being assembled with the rows.

The use of an electrically conductive adhesive enables firstly the mechanical interconnection and secondly the electrical interconnection of the rows of solar elements.

In this way, it is possible in one process step to firstly adhesively bond the rows to one another and secondly also to at least prepare the electrical contact-connection of the solar elements of a row and ultimately also of two adjacent rows to one another.

In the finished solar module, a respective electrical voltage level can be applied within the individual rows of solar elements. Accordingly, there is no electrical voltage build-up beyond the solar elements of a row in the longitudinal direction of the rows. In the finished solar module, an electrical voltage build-up can take place beyond the electrically interconnected rows and thus transversely or at right angles to a longitudinal direction of the rows.

According to the method, the solar elements can thus be combined to form rows, with a respective electrical voltage level being applied within the individual rows of solar elements. The solar modules can then be constructed from electrically interconnected rows, with an electrical voltage build-up in the solar module taking place beyond the electrically interconnected rows and thus transversely or at right angles to a longitudinal direction of the rows.

Within the meaning of the claimed invention, a row can therefore be distinguished from a conventional string of solar elements. In a string, the solar elements are electrically interconnected in such a way that an electrical voltage build-up takes place in the longitudinal direction of the string beyond the electrically interconnected solar elements of the string.

In one embodiment of the method, it is envisaged that a discharge unit, in particular at least one discharge nozzle and/or at least one screen printing unit and/or at least one web-fed printing unit of the discharge unit, for discharging the conductive adhesive remains spatially fixed at least in terms of horizontal position during the discharge. In this embodiment of the method, the electrically conductive adhesive is applied to the rows of solar elements which are moved relative to the discharge unit, which is spatially fixed in that case, during the transfer movement.

To modify a spacing between the rows, the discharge unit, in particular at least one discharge nozzle and/or at least one screen printing unit and/or at least one web-fed printing unit of the discharge unit is adjusted in terms of its vertical position in one embodiment of the method.

In another embodiment of the method, it is envisaged that a discharge unit, in particular at least one discharge nozzle and/or at least one screen printing unit and/or at least one web-fed printing unit of the discharge unit, for discharging the electrically conductive adhesive is moved during the discharge. The discharge unit can be moved in particular in a longitudinal direction and/or obliquely in relation to the longitudinal direction of at least one row of solar elements to which the electrically conductive adhesive is to be applied, and/or in a vertical direction.

In this embodiment of the method, it can be at least one discharge nozzle and/or at least one screen printing unit and/or at least one web-fed printing unit of the discharge unit that is moved during the discharge of the electrically conductive adhesive.

The solar elements of a row that are provided with the electrically conductive adhesive may be installed on the solar module at the same time or sequentially. Individual handling of solar elements which are provided with the electrically conductive adhesive and are intended to assemble the solar module can be avoided if they are installed at the same time.

In this respect, the electrically conductive adhesive may be applied with an adhesive layer having a height of 0.5 mm or less and a width of 0.6 mm or less.

Also proposed to achieve the object is a further method for producing solar modules which comprises at least some of the means and features disclosed herein, which concerns such a method. To achieve the object, what is thus proposed in the case of the method mentioned in the introduction in particular is that the rows are adhesively bonded with an electrically conductive adhesive and that the electrically conductive adhesive is applied to at least two solar elements in a process step.

One or more of the features disclosed herein can be combined with one another in one embodiment of the method.

In one embodiment of the method, it may be envisaged that the at least two solar elements to which the electrically conductive adhesive is applied belong to different rows.

In one embodiment of the method, it may be envisaged to adhesively bond the solar elements of adjacent rows to one another at the same time. In this respect, it is possible to firstly provide a row, which is provided with an adhesive bead, of solar elements on a solar module that is to be produced. Then, a second row of solar elements can be positioned on the already arranged row of solar elements with a certain overlap such that it comes to lie on the adhesive bead of the already provided row of solar elements and in the process is adhesively bonded to the already positioned row of solar elements. In this way, it is avoided that the solar elements of the rows to be interconnected are individually provided with adhesive and individually connected to already positioned solar elements.

In one embodiment of the method, it may be envisaged to adhesively bond the solar elements of adjacent rows to one another sequentially.

In one embodiment of the method, it is envisaged to apply the electrically conductive adhesive to all the solar elements of a row in one process step. This variant of the method promotes a particularly efficient production of solar modules.

It is also possible to apply the electrically conductive adhesive to solar elements of a row with a lateral offset in relation to a longitudinal center axis of the row. This promotes an overlapping connection of two adjacent rows of solar elements on a solar module that is to be produced.

To achieve the object, what is also proposed is a device for producing solar modules which comprises the means and features of the independent claim which concerns such a device.

To achieve the object, what is thus proposed in the case of the device mentioned in the introduction in particular is that the device comprises means by way of which it is designed to carry out a method for producing solar modules according to one of the claims that concerns such a method.

The device may comprise a transfer unit, which is configured for the joint transfer of at least two rows of solar elements to a means for assembling a solar module.

In a preferred embodiment of the device, it comprises at least one discharge unit for discharging electrically conductive adhesive. The discharge unit is preferably configured to discharge electrically conductive adhesive onto at least two rows of solar elements at the same time. The discharge can in this respect be effected preferably onto at least two rows of solar elements that are fed at the same time for assembling a solar module.

The discharge unit may also be configured to discharge electrically conductive adhesive onto at least two rows of solar elements sequentially.

The discharge unit may comprise or be at least one discharge nozzle, in particular two or three or more discharge nozzles, and/or at least one screen printing unit and/or at least one web-fed printing unit. The discharge unit preferably comprises a number of discharge nozzles and/or screen printing units and/or web-fed printing units which corresponds to a number of placement locations for rows on the transfer unit already mentioned above.

In this way, it is possible to apply electrically conductive adhesive to all the rows of solar elements arranged on the transfer unit at the same time by means of the discharge unit. Screen printing units can be used to apply electrically conductive adhesive to the rows in a screen printing process. Web-fed printing units can be used to apply electrically conductive adhesive to the rows in a web-fed printing process.

In one embodiment of the device, it is envisaged that the discharge unit, in particular at least one discharge nozzle and/or at least one screen printing unit and/or at least one web-fed printing unit of the discharge unit, is positionally fixed at least in terms of horizontal position while electrically conductive adhesive is being discharged. In this embodiment of the device, a relative movement, which might be necessary for the application of the electrically conductive adhesive, between the discharge unit, in particular at least one discharge nozzle and/or at least one screen printing unit and/or at least one web-fed printing unit of the discharge unit, and the row of solar elements that is to be provided with the electrically conductive adhesive is a transfer movement of the row that is performed relative to the positionally fixed discharge unit.

In order to be able to modify a spacing between the discharge unit, in particular between a discharge nozzle and/or at least one screen printing unit and/or at least one web-fed printing unit of the discharge unit, and the row of solar elements that is to be provided with the electrically conductive adhesive, it can be expedient if a vertical position of the discharge unit, in particular at least one discharge nozzle and/or at least one screen printing unit and/or at least one web-fed printing unit of the discharge unit, can be modified, for example by way of a correspondingly vertically adjustable mount of the device for the discharge unit, in particular for at least one discharge nozzle and/or for at least one screen printing unit and/or for at least one web-fed printing unit of the discharge unit.

In another embodiment of the device, it is envisaged that the discharge unit, in particular at least one discharge nozzle and/or at least one screen printing unit and/or at least one web-fed printing unit of the discharge unit, is movable, in particular while electrically conductive adhesive is being discharged. The discharge unit, in particular at least one discharge nozzle and/or at least one screen printing unit and/or at least one web-fed printing unit of the discharge unit, to this end can be mounted movably and/or driven by a motor. The movement of the discharge unit, in particular of its at least one discharge nozzle and/or at least one screen printing unit and/or at least one web-fed printing unit, can in this respect be aligned at least in a longitudinal direction of a row of solar elements that is to be provided with electrically conductive adhesive and/or in a longitudinal direction of a placement location for a row of solar elements on a transfer unit, for example the one already mentioned above, of the device.

In one embodiment of the device, it is envisaged that the discharge unit, in particular at least one discharge nozzle and/or at least one screen printing unit and/or at least one web-fed printing unit of the discharge unit, is movable in a longitudinal direction of a row and/or of a placement location for a row on the transfer unit while electrically conductive adhesive is being discharged. To this end, the device may have a corresponding linear guide.

In one embodiment of the device, it is envisaged that two adjacent discharge nozzles and/or screen printing units and/or web-fed printing units of the discharge unit have the same spacing from another as two adjacent rows and/or placement locations for rows on the transfer unit already mentioned above.

This makes it possible to apply electrically conductive adhesive at the same time to adjacent rows of solar elements that are or have been constructed on the transfer unit and are jointly fed for example for assembling of a solar module.

A perpendicular projection of at least one discharge unit, in particular at least one discharge nozzle and/or at least one screen printing unit and/or at least one web-fed printing unit of the discharge unit, onto a placement location for a row of solar elements on the transfer unit can in this respect be laterally offset in relation to a longitudinal center axis of the placement location and/or laterally offset in relation to a longitudinal center axis of a row of solar elements that is arranged at the placement location.

The device may comprise a control unit, by way of which the device is configured for carrying out a method according to one of the claims that concerns a method for producing solar elements.

BRIEF DESCRIPTION OF THE DRAWINGS

The invention will be described in more detail below on the basis of exemplary embodiments but is not restricted to the exemplary embodiments shown. Further exemplary embodiments will emerge by combining the features of individual or multiple claims with one another and/or by combining individual or multiple features of the exemplary embodiments.

In the figures.

DETAILED DESCRIPTION

Figure 1:
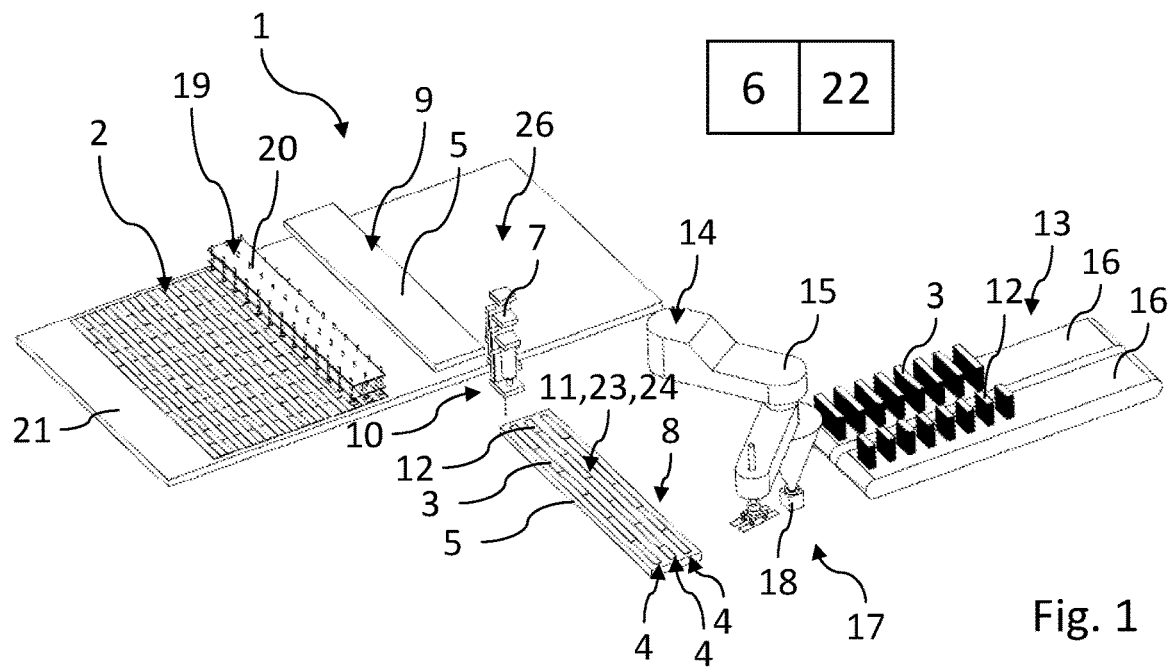
FIGS. 1 and 2 show a first exemplary embodiment of a device for producing solar modules, wherein the device comprises a transfer unit in the form of a negative pressure table, by means of which a total of three rows of solar elements can be transferred jointly to an unloading position in order to assemble a solar module with the rows.

In the following description of various embodiments of the invention, elements which have the same function are provided with the same reference numerals even if the design or shaping differs.

All of the figures show at least parts of a device, denoted by 1 overall, for producing solar modules 2.

Each device 1 comprises means by way of which the device 1 is configured to carry out the method described below for producing solar modules 2.

In the process, solar elements 3 are combined to form rows 4 and solar modules 2 are constructed from the rows 4, which are then electrically interconnected.

At least two rows 4, in the examples shown in the figures at least three rows 4, are constructed and then fed jointly for assembling of a solar module 2.

In all of the exemplary embodiments, shown in the figures, of devices 1, the rows 4 are fed jointly for assembling of the solar module 2 by means of a respective motorized transfer unit 5.

Figure 2:
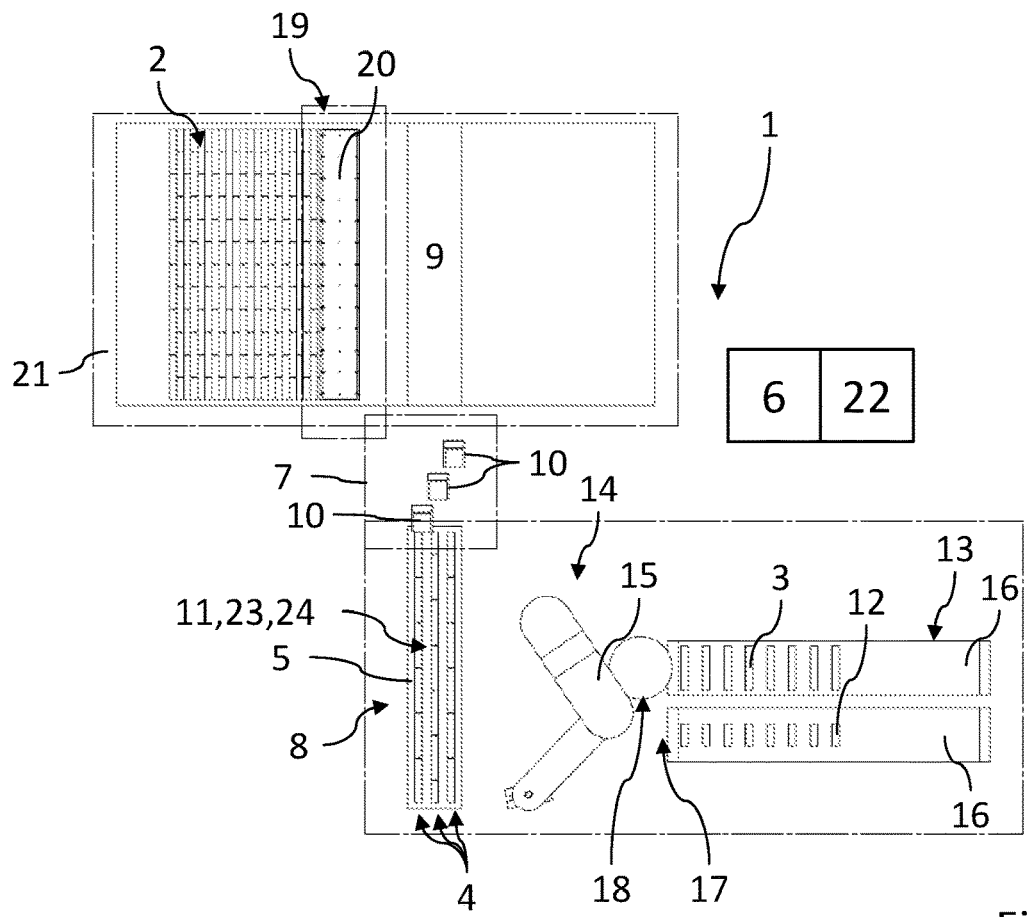

In the exemplary embodiment illustrated in FIGS. 1 and 2 of such a device 1, a negative pressure table is used as transfer unit 5 and is movable between a loading point 8 and an unloading point 9.

Figure 3:
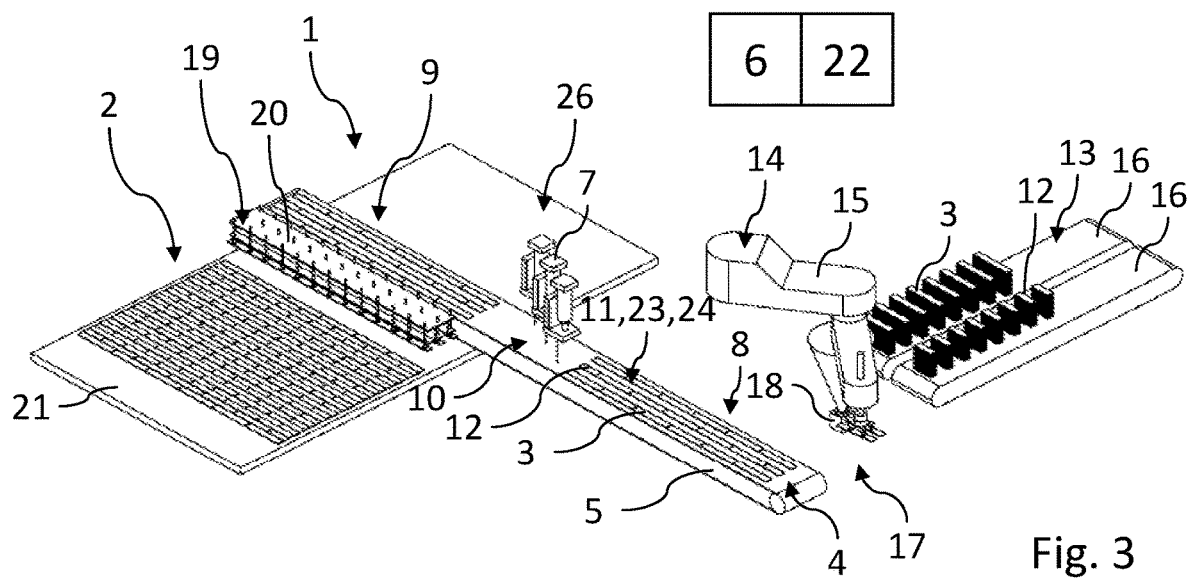
FIGS. 3 and 4 show a second exemplary embodiment of a device for producing solar modules, wherein in this case a transfer unit of the device, by means of which three rows of solar elements can be fed jointly for assembling of a solar module, is in the form of a belt conveyor.
Figure 4:
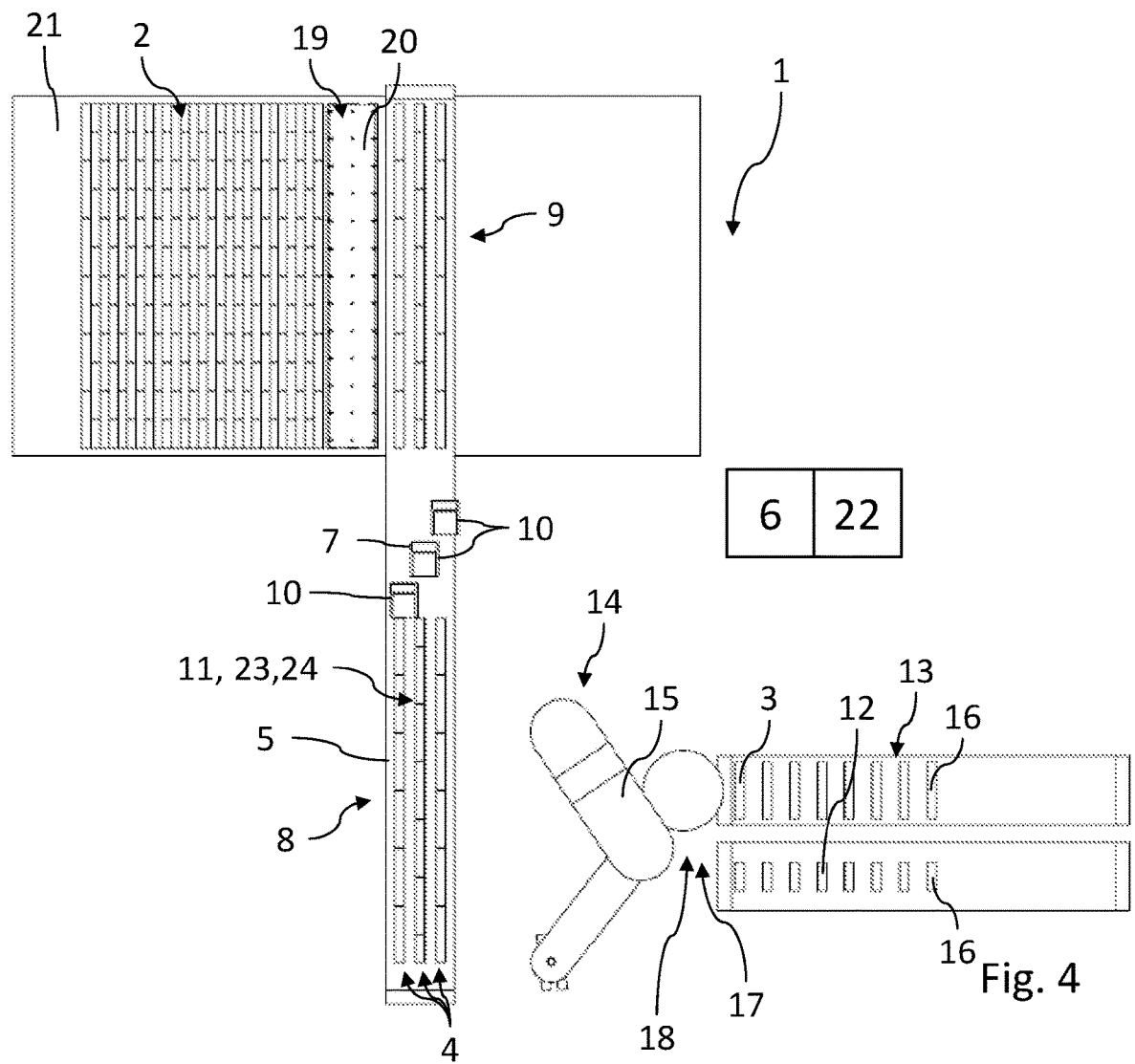

The device 1 shown in FIGS. 3 and 4 has a belt conveyor as transfer unit 5. The transfer movement of the belt conveyor makes it possible to feed the rows 4, which are constructed on the belt conveyor, jointly for assembling of the solar module 2.

Figure 5:
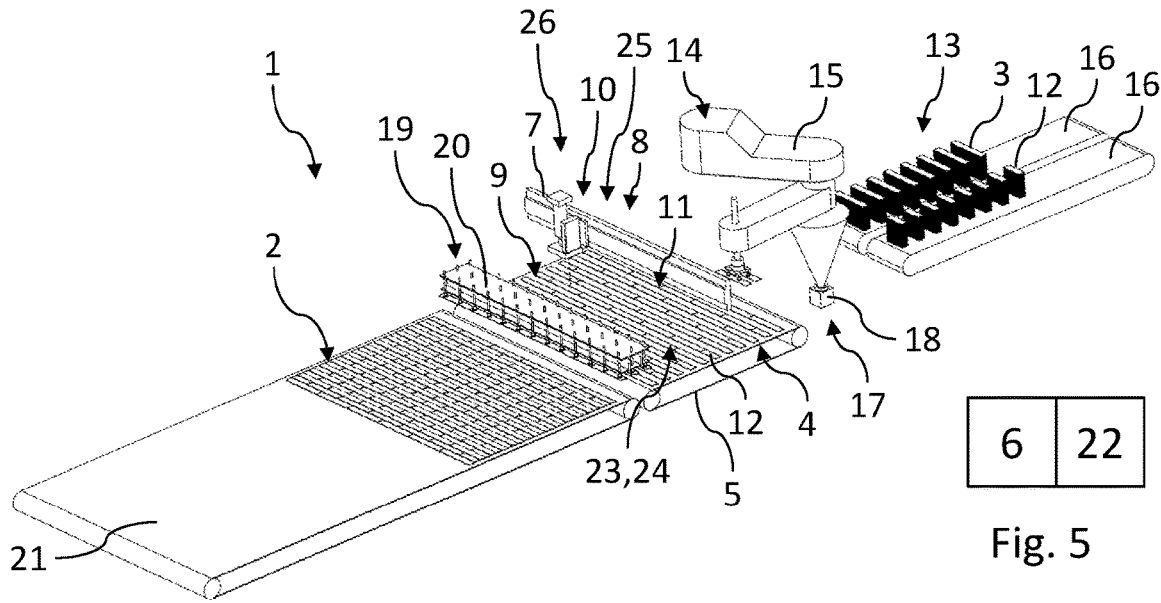
FIGS. 5 and 6 show a third exemplary embodiment of a device for producing solar modules, wherein this device likewise comprises a transfer unit in the form of a belt conveyor, it being the case here however that a transfer movement of the transfer unit is aligned transversely, specifically at right angles, in relation to the orientation of the rows of solar elements arranged on the transfer unit.
Figure 6:
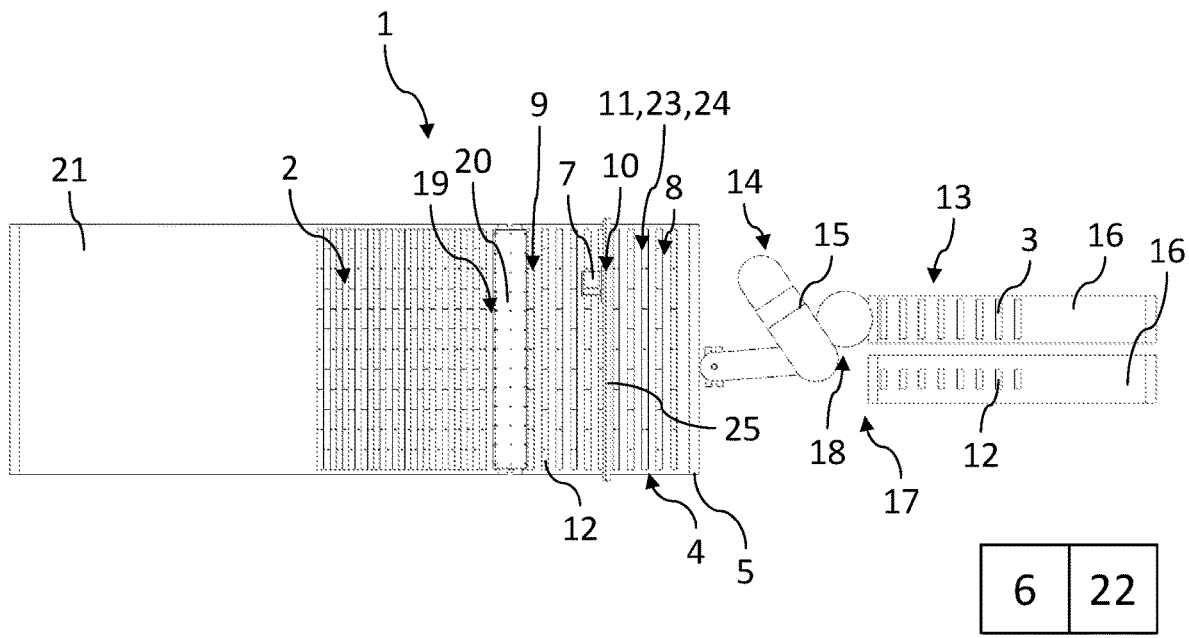

The device 1 shown in FIGS. 5 and 6 is likewise equipped with a transfer unit 5 which is in the form of a belt conveyor.

While in the case of the device 1 illustrated in FIGS. 3 and 4 a transfer movement of the transfer unit 5 takes place in the longitudinal direction of the rows 4 arranged on the transfer unit 5, the transfer movement of the transfer unit 5 of the device 1 illustrated in FIGS. 5 and 6 is transverse, specifically at right angles, to the longitudinal direction of the rows 4 of solar elements 3 that are constructed on the transfer unit 5.

A relative alignment of the solar elements 3 within a row 4 and also of the rows 4, which are constructed on the transfer unit 5, in relation to one another is maintained during the feeding operation.

Each of the devices 1 shown in the Figures comprises a respective negative pressure generation unit 6, by means of which rows 4 of solar elements 3 can be fixed at least temporarily to the respective transfer unit 5 by negative pressure. The negative pressure generation units 6 are illustrated only highly schematically in the Figures.

Each device 1 shown also comprises a discharge unit 7 for discharging electrically conductive adhesive onto rows 4 of solar elements 3, which are arranged on the transfer unit 5. A number of jointly fed rows 4 is matched to a discharge rate of an electrically conductive adhesive in the process. The electrically conductive adhesive is applied to the rows 4 of solar elements 3 in order to mechanically and electrically interconnect the solar elements 3 and rows 4.

In an embodiment of the device 1 which is not illustrated in the figures, the discharge of electrically conductive adhesive onto rows 4 is provided by a screen printing process and/or a web-fed printing process. TO this end, this device 1 comprises a discharge unit 7 for electrically conductive adhesive which is configured for screen printing and/or web-fed printing. Such a discharge unit 7 comprises at least one screen printing unit and/or at least one web-fed printing unit.

The discharge units 7 of the devices 1 are each arranged between the loading point 8, already mentioned above, and the unloading point 9, likewise mentioned above, for rows 4.

The discharge units 7 of the devices 1 shown in FIGS. 1 and 2 and also 3 and 4 comprise a number of discharge nozzles 10 which corresponds to a number of placement locations 11 for rows 4 of solar elements 3 on the transfer unit 5. Consequently, the discharge units 7 of the devices 1 shown in FIGS. 1-4 each have three discharge nozzles 10.

In the embodiments of devices 1 that are shown in FIGS. 1 and 2 and also 3 and 4, the discharge nozzles 10 of the discharge units 7 remain positionally fixed while electrically conductive adhesive is being discharged.

In order to be able to adapt a spacing between the discharge units 7, in particular their discharge nozzles 10, and the rows 4, onto which electrically conductive adhesive is to be applied, as required, it is possible to adjust at least the discharge nozzles 10 of the discharge units 7 in a vertical direction. To this end, the devices 1 comprise a vertically adjustable mount 26 for the discharge nozzles 10. The vertically adjustable mounts 26 can be clearly seen for example in FIGS. 8 and 10.

In the case of the device 1 shown in FIGS. 5 and 6, the discharge unit 7, specifically at least the one discharge nozzle 10 of the discharge unit 7, can be moved in a longitudinal direction of the rows 4 and thus in the longitudinal direction of the placement locations 11 for rows 4 on the transfer unit 5 while electrically conductive adhesive is being discharged. A vertical adjustment of at least the discharge nozzle 10 using a correspondingly adjustable mount 26 is also possible here in order to modify a spacing between the discharge nozzle 10 and the row 4 located beneath it as required.

Perpendicular projections of the discharge nozzles 10 of the discharge units 7 onto the placement locations 11, located beneath them in the use position, for rows 4 on the respective transfer unit 5 are in this case laterally offset in relation to longitudinal center axes of the placement locations 11 and thus also laterally offset in relation to longitudinal center axes of the rows 4 arranged at the placement locations 11. This allows the application of electrically conductive adhesive with a lateral offset in relation to longitudinal center axes of the rows 4. The lateral offset can be seen particularly clearly in FIG. 9 on the basis of the front view of the discharge unit 7 with a transfer unit 5 located beneath it.

Figure 7:
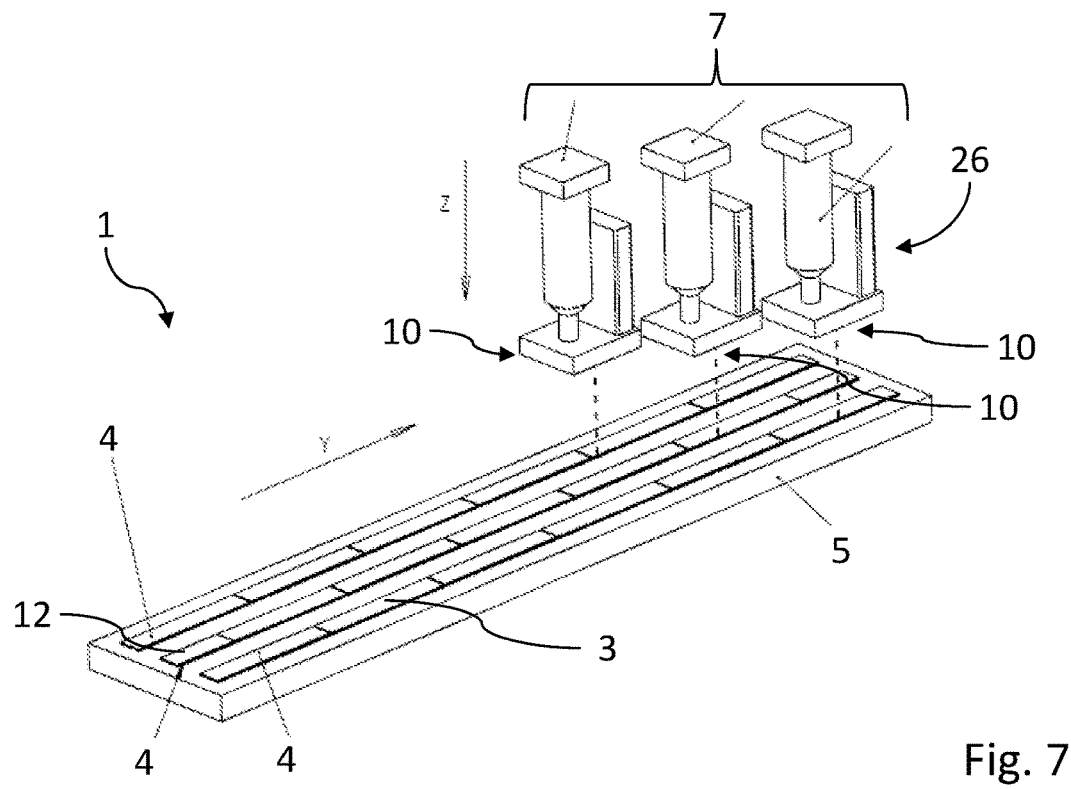
FIG. 7 shows a perspective side view of the discharge unit illustrated in FIGS. 1 and 2 with a total of three discharge nozzles, the perpendicular projections of which onto placement locations on the transfer unit for rows of solar elements have a lateral offset in relation to a longitudinal center axis of the respective placement location.
Figure 8:
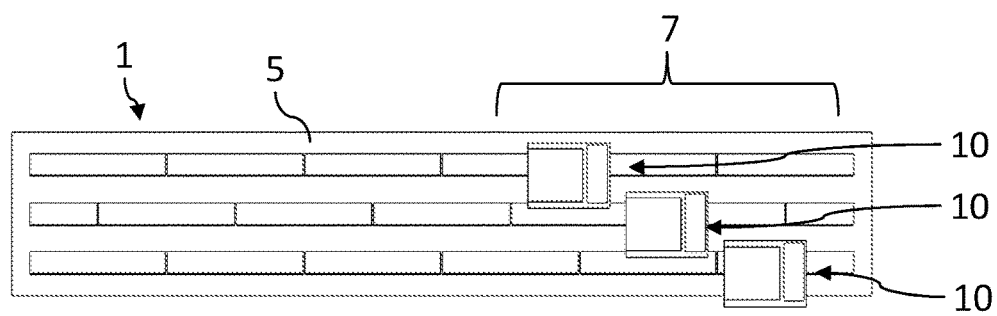
FIG. 8 shows a plan view of the discharge unit depicted in FIG. 7.
Figure 9:
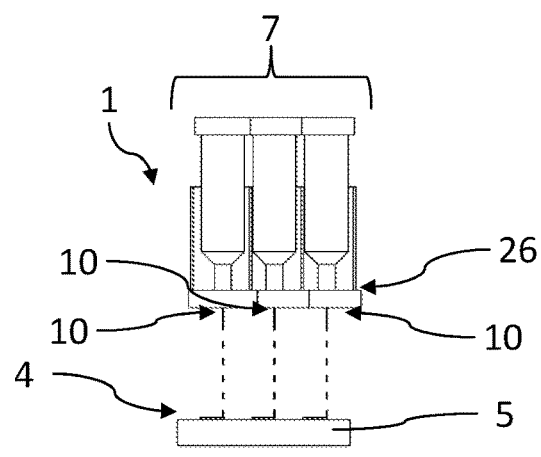
FIG. 9 shows a front view of the discharge unit depicted in FIGS. 7 and 8.

The illustrations in FIGS. 7-9, which reproduce the discharge unit 7 of the device 1 shown in FIGS. 1 and 2, additionally depict that two adjacent discharge nozzles 10 of the discharge unit 7 have the same spacing between one another as two adjacent rows 4 and thus also as two adjacent placement locations 11 for rows 4 on the transfer unit 5.

The negative pressure generation units 6 of the devices 1 are connected to suction openings 23 which the respective transfer unit 5 comprises. Each transfer unit 5 has, for each of its placement locations 11, at least one respective row 24 of such suction openings 23. In this way, the rows 4 of solar elements 3 can be fixed reliably to the transfer units 5 while they are being fed.

In the method implemented on the devices 1 for producing solar modules 2, the rows 4, as already mentioned above, are adhesively bonded by means of an electrically conductive adhesive. The electrically conductive adhesive is applied to the solar elements 3 in the process during a transfer movement of the rows 4 to a means for assembling a solar module 2 with the rows 4.

As already mentioned above, electrically conductive adhesive is applied to the rows 4 of solar elements 3 in the case of the devices 1 shown in FIGS. 1-4 from discharge nozzles 10, which are positionally fixed in terms of horizontal position but can be modified in terms of vertical position, of the respective discharge unit 7. The relative movement, which is required to discharge the electrically conductive adhesive, between the rows 4 and the discharge nozzles 7 is in this respect the transfer movement which is performed by the transfer unit 5 and which causes the rows 4 to move from the loading position 8 to the unloading position 9.

The functioning of the device 1 shown in FIGS. 5 and 6 is different in terms of the discharge of electrically conductive adhesive. The individual discharge nozzle 10 of the discharge unit 7 of this device 1 is moved in a longitudinal direction of a row 4 of solar elements 3 that is to be provided with electrically conductive adhesive while electrically conductive adhesive is being discharged onto the row 4 of solar elements 3 that is located underneath the discharge nozzle 10. For this, the device 1 comprises a linear guide 25. The discharge nozzle 10 of the discharge unit 7 of the device 1 shown in FIGS. 5 and 6 is moved along the linear guide 25 to discharge electrically conductive adhesive onto the row 4 of solar elements 3 that is positioned underneath the discharge nozzle 10. A track, along which the discharge nozzle 10 is moved while electrically conductive adhesive is being discharged, can in this respect have a lateral offset in relation to a longitudinal center axis of a row 4 to be provided with electrically conductive adhesive.

While electrically conductive adhesive is being discharged, the position of the discharge nozzle 10 transversely in relation to the longitudinal extent of the row 4 to be provided with electrically conductive adhesive is kept constant. In this connection, it may be envisaged that the discharge nozzle 10 is movable synchronously with the transfer unit 5 in the direction of the transfer movement of the transfer unit 5.

On all the devices 1, the solar elements 3 of a row 4 that are to be provided with electrically conductive adhesive are installed at the same time on the solar module 2 to be produced.

During the production of solar modules 2, the electrically conductive adhesive is applied to at least two of the solar elements 3 in one process step.

The at least two solar elements 3 are part of different rows 4 in this respect. In the case of the devices 1 shown in FIGS. 1-4, solar elements 3 of a total of three rows 4 are provided with electrically conductive adhesive at the same time in one process step.

When the solar module 2 is being assembled, the solar elements 3 of adjacent rows 4 are adhesively bonded to one another at the same time. To this end, the assembling units 19 shown in the Figures can use their grippers 20 to place the rows 4 fed by the respective transfer unit 5 one on another in succession with a certain overlap, wherein the solar elements 3 of adjacent rows 4 are adhesively bonded to one another at the same time.

In the case of all the devices 1 shown in the Figures, for the construction of the rows 4 reference pieces 12 are used to create an offset between adjacent rows 4 firstly on the respective transfer unit 5 and later also on the fully assembled solar module 2.

The reference pieces 12 are solar elements which have a shorter length than other solar elements, which are denoted by 3 in the Figures and are not in the form of reference pieces 12.

The Figures show that at least two, specifically three or even more, mutually offset rows 4 can be fed jointly for assembling of a solar module 2.

In one embodiment of the method, groups of at least two rows 4 which are fed jointly for joint assembling can be constructed at the same time. It is also possible to use a transfer unit 5 shown in the Figures for this.

To provide the solar elements 3 and the reference pieces 12, each of the devices 1 shown in the Figures comprises a magazine 13. Using a transfer unit 14, which comprises a handling robot 15, specifically a pivot-arm robot, the reference pieces 12 and solar elements 3 provided and stored in the respective magazine 13 can be removed and arranged on the respective transfer unit 5 in rows 4. Each magazine 13 has a total of two conveyor belts 16, on which both the reference pieces 12 and the regular solar elements 3, which are somewhat longer in comparison, are stored in stacks.

To monitor solar elements 3 and also reference pieces 12, each device 1 comprises a monitoring unit 17. The monitoring units 17 are arranged between the magazine 13 and the transfer unit 14 of the respective device 1 and each comprise at least one optical monitoring means, for example a camera 18.

The handling robot 15 of the transfer unit 14 can be used to present the solar elements 3 and/or reference pieces 12 that are picked from the magazine 13 to the camera 18 of the monitoring unit 17, in order to check the solar elements 3 and reference pieces 12 before they are arranged on the respective transfer unit 5. Each of the devices 1 has an assembling unit 19 downstream of the respective transfer unit 5 and also of the unloading point 9. Each assembling unit 19 comprises multiple grippers 20, which are in the form of suction grippers.

The assembling units 19 are configured to take up one or more, or all of the, rows 4 of solar elements 3 provided by the respective transfer unit 5 at the unloading point 9 and transfer them to a downstream transporting unit 21 of the respective device 1. The respective transporting unit 21 serves to feed at least one solar module 2 assembled with rows 4 of solar elements 3 to a downstream processing station, for example an oven.

As already mentioned above, a transfer movement of the transfer unit 5 of the devices 1 shown in FIGS. 1-4 is aligned in a longitudinal direction of placement locations 11 and thus also in a longitudinal direction of rows 4 on the transfer unit 5.

In the exemplary embodiment shown in FIGS. 5 and 6 of the device 1, the transfer movement of the transfer unit 5 is aligned transversely, specifically at right angles, in relation to a longitudinal direction of placement locations 11 and thus transversely, specifically at right angles, in relation to a longitudinal direction of the rows 4, which are arranged on the placement locations 11 of the transfer unit 5.

The transfer movements of the transfer unit 5 of the devices 1 shown in FIGS. 1-4 are aligned transversely, specifically at right angles, in relation to the transporting direction of the respective transporting unit 21, which is downstream of the transfer unit 5.

In the exemplary embodiment shown in FIGS. 5 and 6 of the device 1, the transfer movement of the transfer unit 5 is aligned in the direction of a transporting movement of the transporting unit 21 used there.

The transporting unit 21 of the device 1 illustrated in FIGS. 5 and 6 is, similarly to the transfer unit 5, in the form of a belt conveyor.

To carry out the method described above, each of the devices 1 shown in the Figures also comprises a control unit 22. This control unit 22 makes it possible to actuate the aforementioned functional units of the respective device 1 as intended by the method.

The invention is concerned with improvements to the technical field of the production of solar modules 2. For this, among other things, a method for producing solar modules 2 is proposed, in the course of which rows 4 of solar elements 3 are adhesively bonded by means of an electrically conductive adhesive. The method envisages that the electrically conductive adhesive is applied to the solar elements 3 during a transfer movement of the rows 4.

LIST OF REFERENCE SIGNS

1 Device
2 Solar module
3 Solar element
4 Row
5 Transfer unit
6 Negative pressure generation unit
7 Discharge unit
8 Loading position
9 Unloading position
10 Discharge nozzle
11 Placement location
12 Reference piece
13 Magazine
14 Transfer unit
15 Handling robot
16 Conveyor belt
17 Monitoring unit
18 Camera
19 Assembling unit
20 Gripper
21 Transporting unit
22 Control unit
23 Suction opening
24 Row
25 Linear guide
26 Mount

The invention claimed is:

1. A method for producing solar modules (2), the method comprising:
combining solar elements (3) to form rows (4), wherein each said row (4) comprises at least two solar elements (3);
constructing the solar modules (2) from electrically interconnected rows (4), by adhesively bonding the rows (4) to one another using an electrically conductive adhesive in order to electrically and mechanically interconnect the rows (4) of solar elements (3); and
applying the electrically conductive adhesive to the solar elements (3) during a transfer movement of the rows (4).

2. The method as claimed in claim 1, wherein a discharge unit (7) for discharging the electrically conductive adhesive, during the discharging at least one of a) remains spatially fixed in a horizontal position or b) is adjusted in a vertical position to modify a spacing between the rows (4).

3. The method as claimed in claim 1, wherein the solar elements (3) of one said row (4) that are provided with the electrically conductive adhesive are installed on one of the solar modules (2) at a same time.

4. A method for producing solar modules (2), comprising:
combining solar elements (3) to form rows (4);
constructing the solar modules (2) from electrically interconnected ones of the rows (4);
adhesively bonding the rows (4) to one another by an electrically conductive adhesive in order to electrically and mechanically interconnect the rows (4) of solar elements (3); and
applying the electrically conductive adhesive to at least two solar elements (3) in one process step.

5. The method as claimed in claim 4, wherein the at least two solar elements (3) are part of different ones of the rows (4).

6. The method as claimed in claim 4, wherein the solar elements (3) of adjacent ones of the rows (4) are adhesively bonded to one another at a same time.

7. The method as claimed in claim 4, wherein the electrically conductive adhesive is applied to all of the solar elements (3) of one said row (4) in one process step.

8. A device (1) for producing solar modules (2), the device (1) comprising:
a transfer unit (5) for the joint transfer of at least two rows (4) of solar elements (3) to a means for assembling a solar module (2);

at least one discharge unit (7) for discharging electrically conductive adhesive; and a controller (22), by which the device (1) is configured to carry out the method according to claim 1.

9. The device (1) as claimed in claim 8, wherein the discharge unit (7) comprises at least one of at least one discharge nozzle (10), at least one screen printing unit, or at least one web-fed printing unit.

10. The device (1) as claimed in claim 8, wherein the discharge unit (7), is spatially fixed in a horizontal position while electrically conductive adhesive is being discharged.

11. The device as claimed in claim 8, wherein the discharge unit (7), is movable in a longitudinal direction of at least one of one said row (4) or a placement location (11) for one said row (4) on the transfer unit (5) while electrically conductive adhesive is being discharged.

12. The device (1) as claimed in claim 9, wherein two adjacent ones of the at least one discharge nozzle (10), the at least one screen printing unit, or the at least one web-fed printing unit of the discharge unit (7) have a same spacing from one another as at least one of two adjacent ones of the rows (4) or placement locations (11) for the rows (4) on the transfer unit (5).

13. The device (1) as claimed in claim 8, wherein a perpendicular projection of at least one said discharge unit (7) onto a placement location (11) for one said row (4) on the transfer unit (5) is laterally offset in relation to at least one of a longitudinal center axis of the placement location (11) or a longitudinal center axis of one said row (4) that is arranged at the placement location (11).

14. The method as claimed in claim 1, wherein a discharge unit (7) for discharging the electrically conductive adhesive is moved during the discharging at least one of: a) in a longitudinal direction of at least one said row (4) of the solar elements (3), b) obliquely in relation to the longitudinal direction, or in a vertical direction.

15. The method as claimed in claim 4, wherein the electrically conductive adhesive is applied to the solar elements (3) of the row (4) with a lateral offset in relation to a longitudinal center axis of said row (4).

16. The device (1) as claimed in claim 8, wherein the discharge unit (7) comprises a number of at least one of: a discharge nozzle (10), a screen printing unit, or a web-fed printing unit that corresponds to a number of placement locations (11) for the rows (4) on the transfer unit (5).

17. The device (1) as claimed in claim 8, wherein the discharge unit (7) is movable while electrically conductive adhesive is being discharged.

18. The device (1) as claimed in claim 8, wherein the discharge unit (7) is modifiable in a vertical position thereof by a vertically adjustable mount (26).

* * * * *